United States Patent
Bängtsson et al.

(10) Patent No.: US 9,533,632 B2
(45) Date of Patent: Jan. 3, 2017

(54) TRACK-BOUND VEHICLE CONVERTER

(71) Applicant: Bombardier Transportation GmbH, Berlin (DE)

(72) Inventors: Hans Bängtsson, Strängnäs (SE); Lennart Kruse, Hallstahammar (SE); Luyu Wang, Lund (SE)

(73) Assignee: Bombardier Transportation GmbH, Berlin (DE)

( * ) Notice: Subject to any disclaimer, the term of this patent is extended or adjusted under 35 U.S.C. 154(b) by 911 days.

(21) Appl. No.: 13/713,241

(22) Filed: Dec. 13, 2012

(65) Prior Publication Data
US 2013/0147266 A1  Jun. 13, 2013

(30) Foreign Application Priority Data

Dec. 13, 2011  (EP) .................................... 11193171
Jun. 20, 2012  (EP) .................................... 12172791

(51) Int. Cl.
*B60L 3/00*      (2006.01)
*B60R 16/02*     (2006.01)
*H02M 7/48*      (2007.01)

(52) U.S. Cl.
CPC ............ *B60R 16/02* (2013.01); *H02M 7/4807* (2013.01); *H02M 7/4826* (2013.01)

(58) Field of Classification Search
USPC ........................................................ 307/9.1
See application file for complete search history.

(56) References Cited

U.S. PATENT DOCUMENTS

| 3,487,289 | A | * | 12/1969 | McMurray | H02M 5/225 363/136 |
| 4,523,269 | A | * | 6/1985 | Baker | H02M 5/14 307/110 |
| 5,010,471 | A | * | 4/1991 | Klaassens | H02M 7/4826 363/160 |
| 5,198,970 | A |   | 3/1993 | Kawabata et al. | |
| 6,278,256 | B1 | * | 8/2001 | Aoyama | B60L 3/003 318/801 |
| 2005/0012487 | A1 | * | 1/2005 | Skeist | H02P 9/007 318/727 |
| 2009/0154045 | A1 | * | 6/2009 | Bleus | H02H 3/025 361/93.9 |

(Continued)

OTHER PUBLICATIONS

Fernandez et al., "Single Stage Inverter for a Direct AC Connection of a Photovoltaic Cell Module," six pages.

(Continued)

*Primary Examiner* — Ronald W Leja
(74) *Attorney, Agent, or Firm* — Dilworth & Barrese, LLP.

(57) ABSTRACT

A track-bound vehicle converter comprises a block-wave generator (20) configured to be connected to a direct voltage source (21) and connected to a series resonance link (34), or to an inductive link, for providing the input of a direct converter (41) with semi sinusoidal current pulses. The direct converter has at least one phase leg (42-44) having on one hand one switch (45-47) connected to the link (34) and able to block voltages in both directions thereacross and conduct current in both directions therethrough and on the other a capacitor (48-50) connected in series therewith. The voltage across the capacitor (48-50) of the direct converter is used to provide a converter output with an alternating voltage.

18 Claims, 7 Drawing Sheets

(56) References Cited

U.S. PATENT DOCUMENTS

| | | | | |
|---|---|---|---|---|
| 2012/0063184 | A1* | 3/2012 | Mazumder | H02M 7/4807 363/98 |
| 2012/0170341 | A1* | 7/2012 | Fornage | H02M 7/5387 363/132 |
| 2012/0262967 | A1* | 10/2012 | Cuk | H02M 7/4807 363/131 |
| 2012/0294057 | A1* | 11/2012 | Fornage | H02M 7/4807 363/131 |
| 2013/0147266 | A1* | 6/2013 | Bangtsson | B60R 16/02 307/9.1 |
| 2014/0334215 | A1* | 11/2014 | Bucheru | H02M 3/33584 363/132 |
| 2015/0049519 | A1* | 2/2015 | Izadian | H02M 1/08 363/21.02 |
| 2015/0061569 | A1* | 3/2015 | Alexander | B60L 11/1809 320/101 |
| 2015/0098251 | A1* | 4/2015 | Harrison | H02J 3/383 363/17 |

OTHER PUBLICATIONS

Ishida et al, "Real-Time Output Voltage Control Method of Quasi-ZCS Series Resonant HG-Linked DC-AC Converter," IEEE Transactions on Power Electronics, vol. 10, No. 6, Nov. 1995, pp. 776-783.

Li et al, "A Review of the Single Phase Photovoltaic Module Integrated Converter Topologies with Three Different DC Link Configurations," IEEE Transactions on Power Electronics, vol. 23, No. 3, May 2008, pp. 1320-1333.

Pinheiro et al, "Zero Voltage Switching Series Resonant Based UPS," 1998 IEEE, pp. 1879-1885.

Sul et al, "Field Oriented Control of an Induction Machine in a High Frequency Link Power System," PESC '88 Record (Apr. 1988), pp. 1084-1090.

Wei et al, "Analysis and Simulation of Series-Resonant High-Frequency AC-Linked DC-AC Converter Realizable by Inverter Modules," 1997 IEEE, pp. 815-820.

* cited by examiner

TRACK-BOUND VEHICLE CONVERTER

TECHNICAL FIELD OF THE INVENTION AND BACKGROUND ART

The present invention relates to a track-bound vehicle converter as well as a track-bound vehicle having at least one such converter.

Such a converter is arranged in a track-bound vehicle, such as a rail vehicle, for converting a direct voltage to an alternating voltage or vice versa for different purposes. The invention also includes indirect AC/AC converters, i.e. converters with two stages, interconnected on their DC sides. The invention is not restricted to any number of phases of this alternating voltage, although single phase and three phase voltages are most common, neither is the invention restricted to any particular levels of such voltages or electric power to be fed through said converter.

The present invention is primarily directed to an auxiliary converter, i.e. a converter configured to deliver a voltage on the converter output to be used for electrical appliances, such as through socket outlets arranged in the track-bound vehicle and the heating/cooling system of the vehicle. However, the invention does also cover motor converters configured to deliver power through the converter output to a motor used to drive the vehicle as well as line converters configured to
in driving mode absorb power from the AC supply line via the main transformer connected to its AC side and feed it to the motor converter connected to its DC side and
in braking mode absorb power from the motor converter and feed it to the main transformer and back to the AC supply line.

FIG. 1 illustrates schematically how these three types of converters may be arranged in a track-bound vehicle 1. It is shown how the vehicle is in this case configured to move along an AC-supply line 2, which accordingly acts as a AC-source and which may for example carry an one-phase alternating voltage of 15 kV and 16⅔ Hz (Sweden) and 25 kV and 50 Hz (Denmark). The vehicle has a transformer 3 for transforming the voltage from the supply line 2 to a suitable level. The transformer has here two secondary windings 4, 5, one of which being connected to a converter 6 for delivering a direct voltage of for example 1.5-3 kV on the output thereof. This direct voltage is delivered to an auxiliary converter 7, which is controlled by a control unit 8 for generating a train of pulses according to a Pulse Width Modulation pattern for delivering a three-phase alternating voltage on the output thereof. The output of the converter is connected to a three-phase transformer 9 as well as harmonic filters 10 for smoothing out the alternating voltage delivered by a distribution network 11 to sockets arranged in the track-bound vehicle, such as for connection of computers, and to lighting, heating and other appliances.

The other secondary winding 4 of the transformer 3 is connected to a converter 12 configured to deliver a direct voltage on the output thereof to the input of a motor converter 13 controlled by a control unit 14 in a similar manner as the control carried out by the control unit 8 for delivering a three-phase alternating voltage on the output thereof to motors 15 in the form of electric machines, for driving the vehicle. The control unit 14 will receive orders from the driver of the vehicle for adapting the frequency of the voltage delivered to the stator windings of the motors to the vehicle speed being desired. In the case of braking the vehicle electric power will flow in the direction from the motors to the AC-supply line 2 through the converter 12 then acting as a line converter controlled through a control unit 16 to deliver a single phase alternating voltage on the output thereof.

The invention is just as well directed to track-bound vehicle converters to be used in vehicles fed by a power supply line in the form of a DC-source, and in such a case the part to the left of the dashed line 17 in FIG. 1 is not needed, but the direct voltage supply line will then be connected via a line filter inductor to the direct voltage side of the converters 7 and 13 close to said dashed line 17. However, the DC-power supply line may then be connected to a DC/DC-converter controlled by a control unit if the DC-power supply voltage is for example 3 kV for adjusting the supply voltage level to the motor converter 13 and the auxiliary converter 7 to for example 1 500 V.

The control units 8, 14, 16 of these converters utilising a Pulse Width Modulation (PWM) scheme for controlling the converters which produces voltage pulses on the outputs thereof with steep flanks, such as in the order of 2 000 V/µs, resulting in high requirements of insulations, such as in bearings, stator winding pockets and so on for avoiding creation of detrimental eddy currents. Furthermore, heavy and costly filters (only shown for the auxiliary converter in FIG. 1) have to be connected to the outputs of these converters for removing low and high frequency harmonics resulting from the switching of components of the converters producing the pulses.

SUMMARY OF THE INVENTION

The object of the present invention is to provide a track-bound vehicle converter being improved in at least some aspect with respect to such converters already known while to at least some extent addressing any of the problems disclosed above of known such converters.

This object is according to the invention obtained by providing a track-bound vehicle converter, which is characterized in that it comprises:
 a block wave generator configured to be connected to a direct voltage source and having current valves,
 first means configured to control said current valves to generate block voltage pulses being alternatively positive and negative on an output of said generator,
 a series resonance link with at least one first capacitor, or an inductive link, and at least one inductance connected by a first end thereof to the output of the generator and designed to make said block voltage pulses to generate semi sinusoidal current pulses, or triangular pulses in case of a said inductive link, on a second end of said link,
 a direct converter comprising at least one phase leg having on one hand one switch connected to said second link end and able to block voltages in both directions thereacross and conduct current in both directions therethrough and on the other a second capacitor connected in series therewith, said direct converter having an output between said switch and said second capacitor for the voltage across this capacitor,
 second means configured to control said switch to alternatively block or let through said current pulses from said series resonance link, or from a said inductive link when such is used as an alternative to a series resonance link, to said second capacitor for controlling the voltage on said converter output by charging or discharging said capacitor.

When a series resonance link is used, the series resonance link connected to the output of the block wave generator makes the block wave generator soft switching, since the current valves of this generator may be controlled to switch at zero current therethrough. This reduces electro-magnetic emission and the need of isolation of different parts, such as motor bearings and stator windings. The output current from the block wave generator in combination with the series resonance link, when this is used, is shown in appended FIG. 2. Thus, semi sinusoidal current pulses, or triangular current pulses from an inductive link when such a link is used as an alternative to a series resonance link, A, B are fed to the direct converter of the converter according to the invention. Positive such current pulses will by control of the direct converter be fed to said second capacitor when the voltage there-across has to be increased and negative such current pulses to the capacitor when the voltage thereacross shall be reduced. This means that a multilevel voltage being nearly totally sinusoidal may be created directly on said converter output without any need of large harmonic filters resulting in a weight gain. Furthermore, the number of semiconductor devices of the converter may also be reduced with respect to corresponding converters already known.

According to an embodiment of the invention said second means is configured to control said switch to let through a current pulse from said series resonance link, or from a said inductive link when such a link is used as an alternative to a series resonance link, to said second capacitor corresponding to half a period of the current generated on said second end of said link. Not all current pulses shall be used to charge or to discharge the output capacitors. If the deviation between actual and requested output voltage at a certain time is big enough for a correction and if the next pulse has the right polarity for a correction, a current pulse shall be let through, otherwise not.

When a positive current pulse is let through the resonance link, when this is used, the polarity of the resonance capacitor will change from negative to positive voltage during the pulse. Correspondingly, when a negative current pulse is let through the resonance link, when this is used, the polarity of the resonance capacitor will change from positive to negative voltage during the pulse. The resonance capacitor, when a resonance link is used, must be recharged to negative polarity before a positive current pulse can be generated to increase the output capacitor voltage, and opposite, the resonance capacitor, when a resonance link is used, must be recharged to positive polarity before a negative current pulse can be generated to decrease the capacitor output voltage. So, every second current pulse through the resonance link, when such is used, shall be positive and every second current pulse through the resonance link must be negative.

According to another embodiment of the invention said block wave generator has two branches configured to be connected in parallel to a direct voltage source and each having two current valves connected in series and each current valve has at least one semiconductor device of turn-off type and a rectifying member, such as a diode, connected in anti-parallel therewith, and the two mid points between the current valves of each branch form the output of the generator.

According to another embodiment of the invention the converter comprises a further so-called shunt switch able to block voltages in both directions thereacross and conduct current in both directions therethrough in a current path in parallel with said phase legs, and it comprises means configured to check the synchronization of the voltage of said first capacitor with the polarity of the direct voltage from the direct voltage source and a third control unit configured to control said further switch to discharge the first capacitor through said current path if said synchronization is lost and then charge this capacitor to a voltage with the opposite polarity to obtain said synchronization again. For the operation of the converter the voltage of said first capacitor, i.e. the so-called resonance capacitor, must be synchronized with the polarity of the driving voltage. This embodiment of the invention enables reestablishment of this synchronization would it be lost, and this may be done without effecting the output load ac-voltage.

The direct converter may also sometimes require two or more consecutive current pulses to be of the same polarity to produce the desired voltage on the output capacitors. To make this possible, said shunt switch is provided in parallel with the output phases. In this way any current pulse of unwanted polarity can be shunted past the direct converter without influencing the output voltages and prepare the resonance link, when such link is used, for providing a current pulse of the required polarity. Such a pulse with unwanted polarity can thus be generated between two pulses with same, requested polarity. This said shunt is not necessary in all kinds of converters, primarily in three phase and simplest single phase converter. It may be suited to use an entire positive or negative sinusoidal current pulse for gradually increasing or decreasing the voltage across said second capacitor. In a converter with an inductive link, the said shunt is not necessary.

According to another embodiment of invention said first means is configured to switch said current valves with a frequency of 1 kHz-100 kHz. Creation of semi sinusoidal current pulses, or triangular current pulses when an inductive link is used, with such a frequency will make it possible to create a multi-level voltage on the output of the direct converter, since this voltage will have a much lower frequency, such as 50 Hz, 60 Hz for an auxiliary converter, 0-300 Hz for a motor converter or 16⅔ Hz, 25 Hz, 50 Hz or 60 Hz for a line converter.

According to another embodiment of the invention the converter is configured to deliver a power of 10 kVA-1 MVA on said converter output. In the case of an auxiliary converter the power will mostly be 10 kVA-200 kVA and for a motor converter and a line converter the power will normally be in the range of 70 kVA-1 MVA.

According to another embodiment of the invention the converter comprises a transformer connected in said series resonance link, or connected in an inductive link when such is used, to said direct converter. The galvanic isolation of the block wave generator input and by that said direct voltage source with respect to the direct converter is particularly suitable when the track-bound vehicle is fed by a DC-supply line, but such a transformer may also be desired in the case of an AC-supply line for galvanically separating the auxiliary voltage from the motor supply or for changing the level of the voltage on the input of the direct converter.

According to another embodiment of the invention said second end of said series resonance link, or of an inductive link when such is used, is directly connected to at least one phase leg of the direct converter, which may in some cases be an attractive option in the case of an AC-supply line, especially for the line converter.

According to another embodiment of the invention said converter is an auxiliary converter configured to deliver a voltage on the converter output to be used for electrical appliances, such as through socket-outlets arranged in said vehicle and the heating/cooling system of the vehicle. It is then also preferred to have a transformer connecting said series resonance link, or connecting an inductive link when such is used, to said direct converter.

According to another embodiment of the invention the converter is a motor converter configured to deliver power through the converter output to a motor used to drive the vehicle.

According to another embodiment of the invention the converter is a line converter configured to
in braking mode deliver power on its AC side and back to the AC supply line via the main transformer and
in driving mode absorb power on its AC side and deliver in on its DC side.

According to another embodiment of the invention said direct converter has three said phase legs connected in parallel and each having a said switch and a said second capacitor connected in series, and said second means is configured to control the switches of the three phase legs so as to make second capacitors belonging to the different phase legs sharing said current pulses from said series resonance link, or from an inductive link when such is used. A converter of the type according to the present invention is very advantageous in the three phase case, since in each moment not all phases are increasing or reducing the output voltage. Instead, one phase is increasing the voltage while the other two are reducing the voltage or two phases are increasing the voltage and the third is reducing the voltage, so that all semi sinusoidal current pulses, or triangular pulses when an inductive link is used, both positive and negative, can be used simultaneously. Thus, would the block wave generator switch with a frequency of 9 kHz generating 9000 positive and as many negative pulses in a second, the switches of the direct converter may provide the second capacitor of each phase with 6 000 current pulses per second for generating a smooth sinusoidal alternating voltage upon the respective converter phase output. It has also turned out that such smooth alternating voltages having the same appearances for all the three phases of the converter output may be generated both in the case of no load on the converter output and an asymmetric load thereon, i.e. different loads on the phases thereof, which may often be the case for a said auxiliary converter.

According to another embodiment of the invention said direct converter on its output side has only one said phase leg having a said switch and a said second capacitor connected in series and said second means is configured to control the switch of the phase leg so as to create an alternating voltage resulting in a smooth well defined sinusoidal single phase voltage.

According to another embodiment of the invention directed to the single phase voltage alternative said direct converter has two said phase legs connected in parallel, and said second means is configured to control the two switches of these phase legs so as to enable said converter output to create an alternating voltage being a single phase voltage delivered by the voltage across the converter outputs of said two phase legs, which results in a balanced output of the converter.

According to another embodiment of the invention also directed to the single phase alternative and with a transformer connecting said series resonance link, or connecting an inductive link when such is used, to said direct converter, said transformer has a primarily winding connected to said series resonance link, or connected to an inductive link when such is used, and two secondary windings, each secondary winding is connected to a said phase leg each of the direct converter, and the two secondary windings are inverted with respect to each other. By inverting one current in this way, two single phase voltages can be generated simultaneously, one through the normal current pulses and one through current pulses being inverted with respect thereto, which is suitable for a line converter module in which normally two single phase voltages are generated.

The invention also relates to a track-bound vehicle having at least one converter according to the invention resulting in a number of advantages disclosed above, such as reduction of weight and costs.

Further advantages as well as advantageous features of the invention will appear from the following description of embodiments of the invention.

BRIEF DESCRIPTION OF THE DRAWINGS

With reference to the appended drawings, below follows a specific description of the embodiments of the invention cited as examples. In the drawings.

DETAILED DESCRIPTION OF EMBODIMENTS OF THE INVENTION

Figure 3:
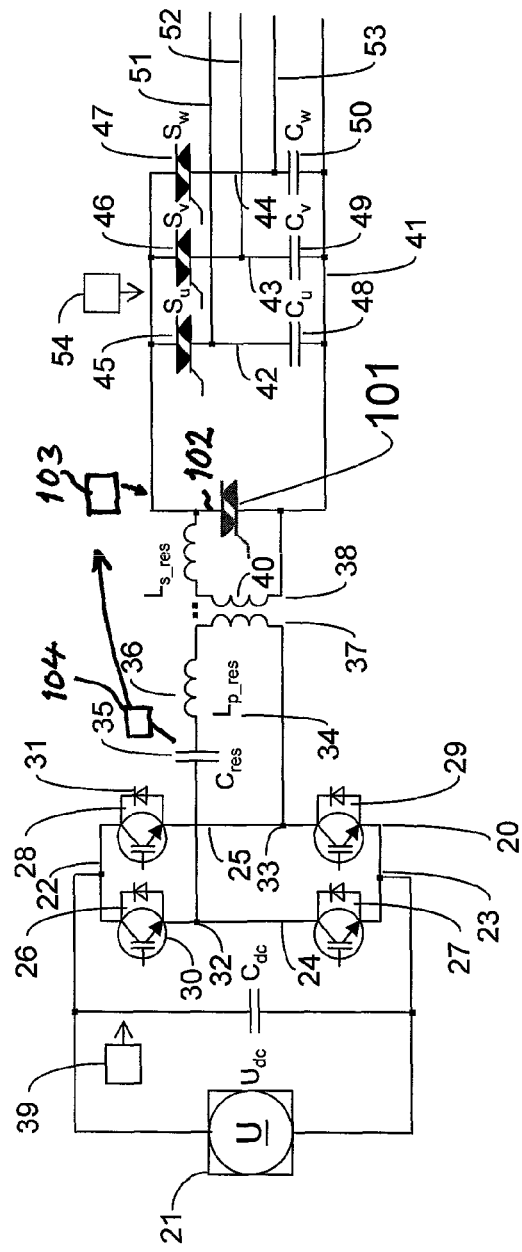
Figure 3:
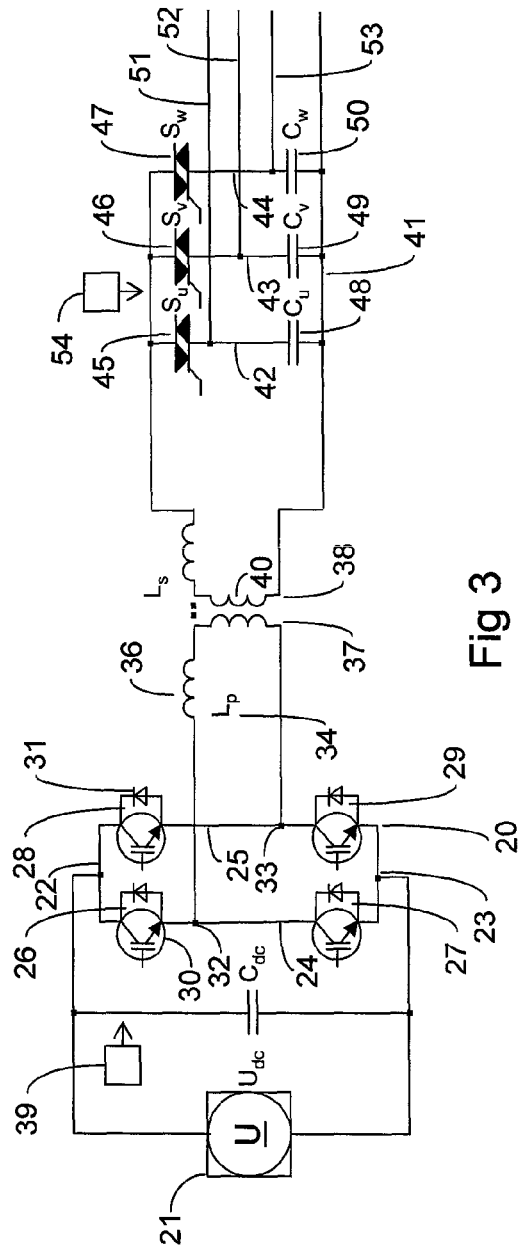

A track-bound vehicle converter according to a first embodiment of the invention for delivering a three-phase alternating voltage on the output thereof is illustrated in FIG. 3. The values of the different parameters thereof will hereinafter by way of example be disclosed for an auxiliary converter, although a converter according to this embodiment may just as well be used as a motor converter. The converter has a block wave generator 20 configured to be connected to a direct voltage source 21, which in this example provides a direct voltage of 750 V across the terminals 22, 23 of the block wave generator. The block wave generator has two branches 24, 25 configured to be in parallel to the direct voltage source and each having two current valves 26-29 connected in series. Each current valve has a semiconductor device of turn-off type 30, here an IGBT, and a rectifying member 31, here a diode, connected in anti-parallel therewith. The two midpoints 32, 33 between the current valves of each branch form the output of the generator.

A series resonance link 34 with a first capacitor 35, or an inductive link, and an inductance 36 is connected by a first end thereof to one 32 of said midpoints and by another end thereof to the primary winding 37 of a transformer 38 to which also the other midpoint 33 of the other block wave generator branch is connected.

Figure 1:
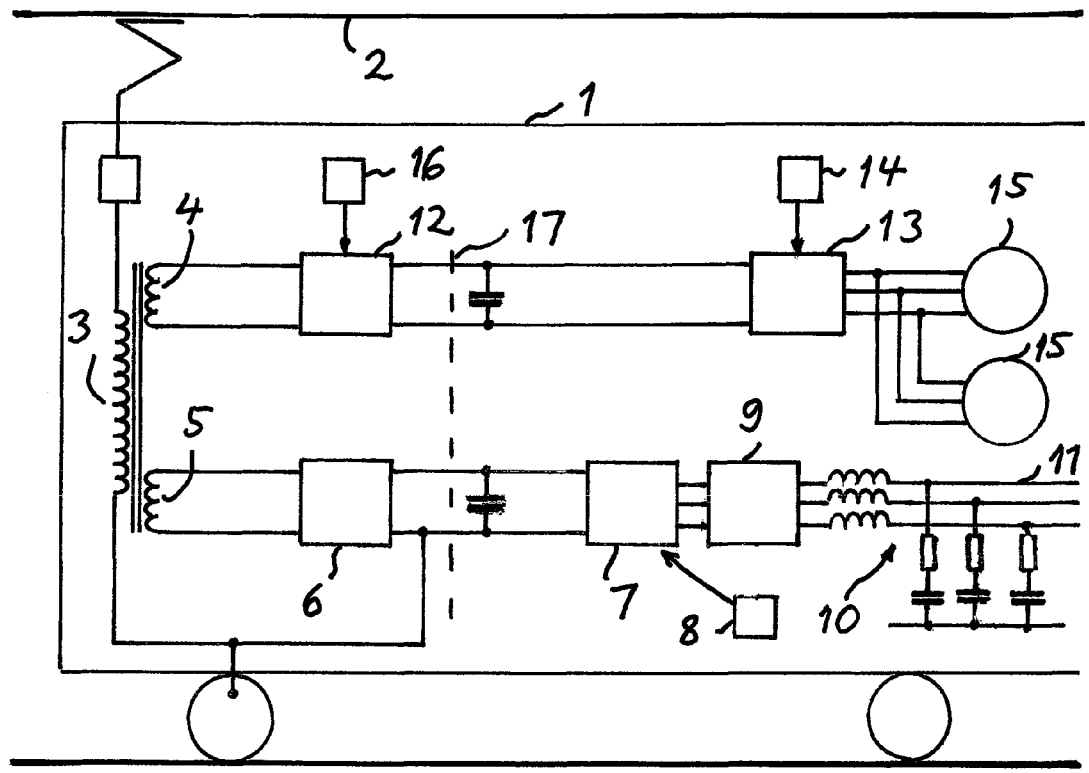
FIG. 1 is a very schematic view illustrating how different types of converters of the type to which the present invention is directed may be arranged and controlled in a track-bound vehicle.
Figure 2:
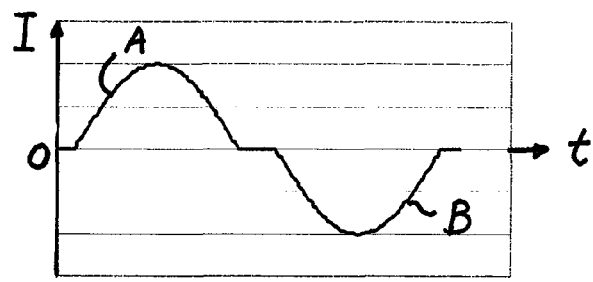
FIG. 2 is a graph showing two consecutive current pulses generated by a block wave generator in combination with a series resonance link, or in combination with an inductive link when such is used, in an converter according to the present invention, as the one shown in FIG. 3, FIG. 3-7 are schematic circuit diagrams of converters according to first, second, third, fourth and fifth embodiments of the present invention.

A first control unit 39 forms first means configured to control the current valves 26-29 of the block wave generator to generate rectangular block pulses being alternatively positive and negative with the amplitude of the direct voltage of the direct voltage source, i.e. 750 V. By turning on the IGBT:s of the current valves 26 and 29 a positive block wave voltage will be sent to the series resonance link, or to the inductive link when such is used, while turning on the IGBT:s of the current valves 27 and 28 will result in an opposite negative block wave voltage to the series resonance link, or to the inductive link when such is used. This switching of the current valves of the block wave generator will take place at zero current and by that be a soft switching, when the series resonance link is used, and the frequency will here be 8 kHz and will through the presence of the series resonance link 34 result in a generation of semi sinusoidal current pulses, when the series resonance link is used, with the appearance according to FIG. 2 arriving to the primary winding of the transformer 38. Thus, 8 000 positive and 8 000 negative such current pulses will be generated per second.

The secondary winding 40 of the transformer is connected to a direct converter 41 having three phase legs 42-44 having each on one hand one switch 45-47 connected to one end of the secondary winding of the transformer and able to block voltages in both directions thereacross and conduct current in both directions therethrough and on the other a second capacitor 48-50 connected in series therewith. The switches 45-47 may for example be two thyristors connected in anti-parallel. Each phase leg of the direct converter has an output 51-53 between the switch and the second capacitor of that phase leg for the voltage across this capacitor.

A second control unit 54 provides second means configured to control the switches 45-47 to alternatively block or let through said current pulses from said series resonance link, or from an inductive link when such is used, to the second capacitors 48-50 for controlling the voltage on the converter outputs 51-53 by charging or discharging the capacitors 48-50. An alternating voltage with a frequency of 50 Hz and an rms value of 400 V between phases may by this be generated on each converter output 51-53 and feeding the distribution network of the train. It is obvious that a switching frequency of 8 kHz of the block wave generator and an alternating voltage of 50 Hz on the output of the converter will provide a high number, such as in the order of 100, current pulses from the series resonance, or from the inductive link when such is used, to be used for generating one period of the alternating voltage on each phase of the converter output. Thus, no heavy filters are necessary for smoothing out the voltages on the output of the converter. Costs are also saved in comparison with known converters utilising current valves switched by Pulse Width Modulation patterns with respect to the number of semiconductor devices used therefor.

The converter also comprises a further so-called shunt switch 101 able to block voltages in both directions thereacross and conduct current in both directions therethrough in a current path 102 in parallel with said phase legs. The converter comprises means 104 configured to check the synchronization of the voltage of the first capacitor 35 with the polarity of the direct voltage from the direct voltage source 21 and a third control unit 103 configured to control said further switch 101 to discharge the first capacitor 35 through said current path 102 if said synchronization is lost and then charge this capacitor to a voltage with the opposite polarity to obtain said synchronization again. Accordingly, this switch 101 ensures synchronization of the voltage of the resonance capacitor with a polarity of the driving voltage for proper operation of the converter. The voltage of the first capacitor is synchronized with the polarity of the direct voltage from the direct voltage source when a positive pulse voltage between the points 32 and 33 and a negative first capacitor voltage facing the point 32, and vice versa, exist at the same time.

All embodiments shown in FIGS. 3-8 are shown with and without the resonance capacitor 35. And in case of no such capacitor the shunt switch 101 is not needed.

Possible data for the converter according to the embodiment shown in FIG. 3 are: capacitance of first capacitor 50 µF, when a resonance link is used, inductance of the series resonance link 3.03 µH and of the secondary winding of the transformer 3.03 µH, capacitance of each second capacitor 2 mF, transformer ratio 1:1, load 100 kW.

Figure 4:
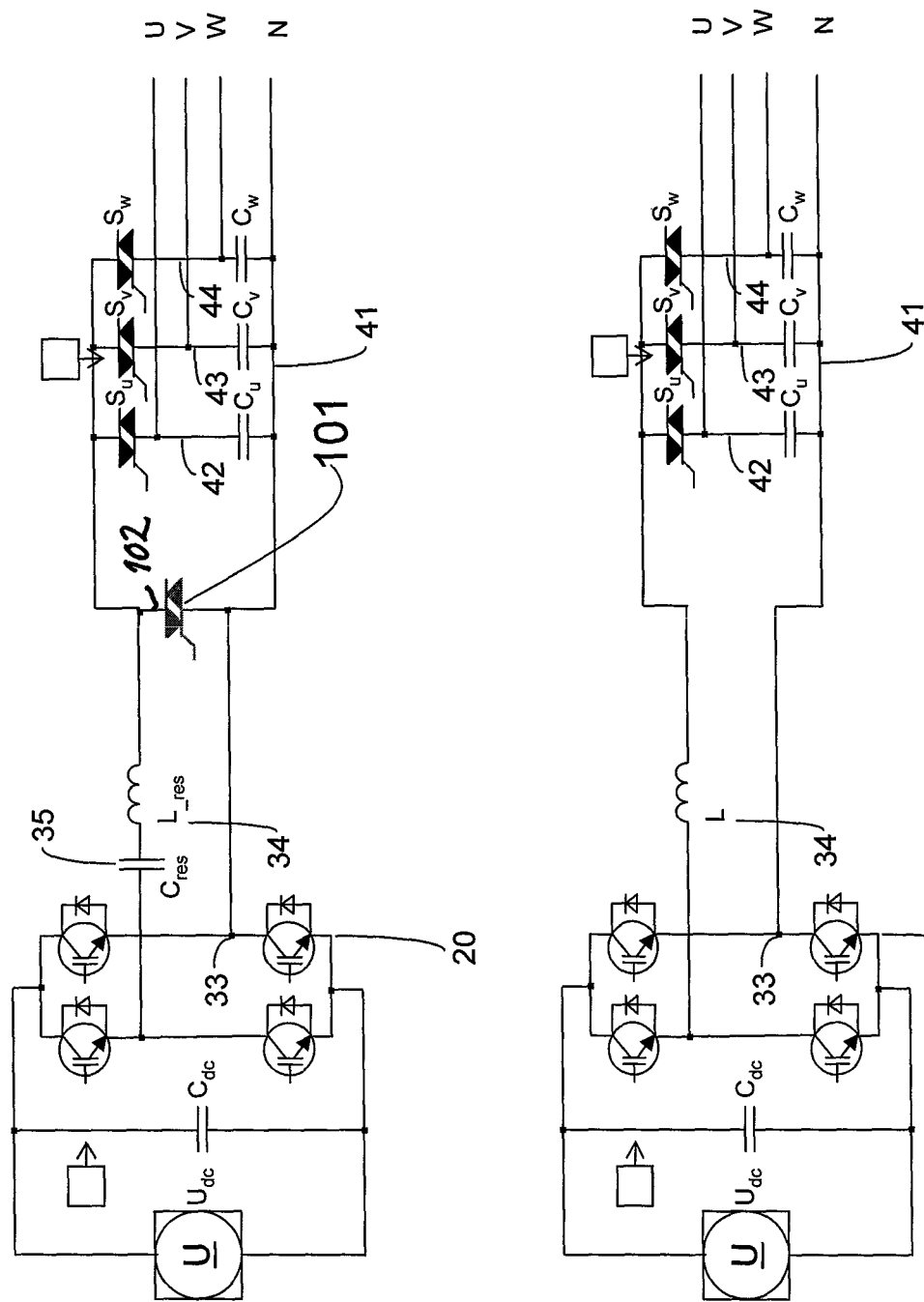

FIG. 4 illustrates an converter according to a second embodiment of the invention differing from the converter shown in FIG. 3 by having the series resonance link 34, or by having the inductive link when such is used, connected directly to the phase legs of the direct converter 41 with one midpoint 33 of the block wave generator branches connected to the opposite terminal of the phase legs 42-44. The converter according to this embodiment will operate in the same way as the converter shown in FIG. 3 but lack galvanic isolation between the direct voltage side and the alternating voltage side thereof. This converter is particularly suited as motor converter, whereas the one according to FIG. 3 would mostly be preferred as auxiliary converter option.

Figure 5:
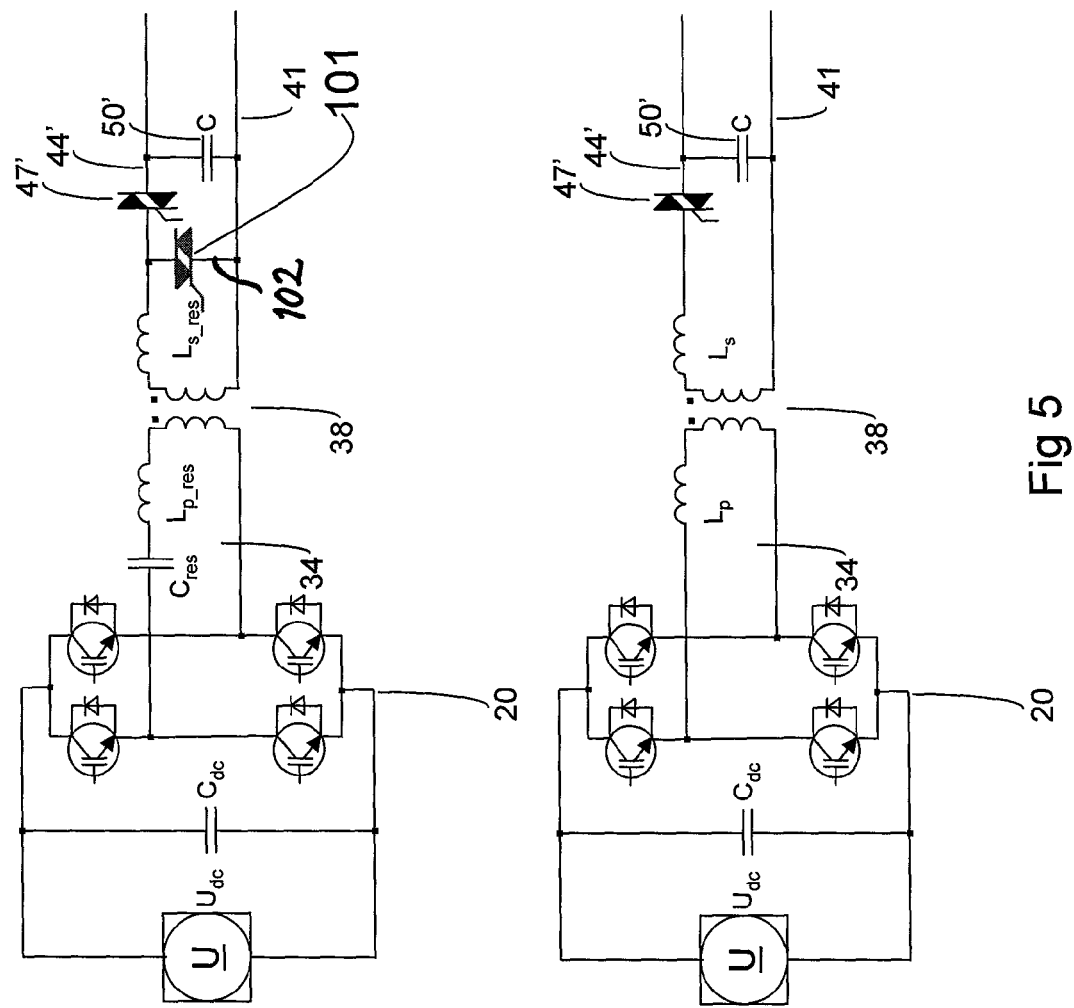

FIG. 5 illustrates an converter according to a third embodiment of the invention configured to provide a single phase alternating voltage on the output thereof and differing from the converter shown in FIG. 3 by having a direct converter with only one phase leg 44' with one switch 47' and one second capacitor 50'.

Figure 6:
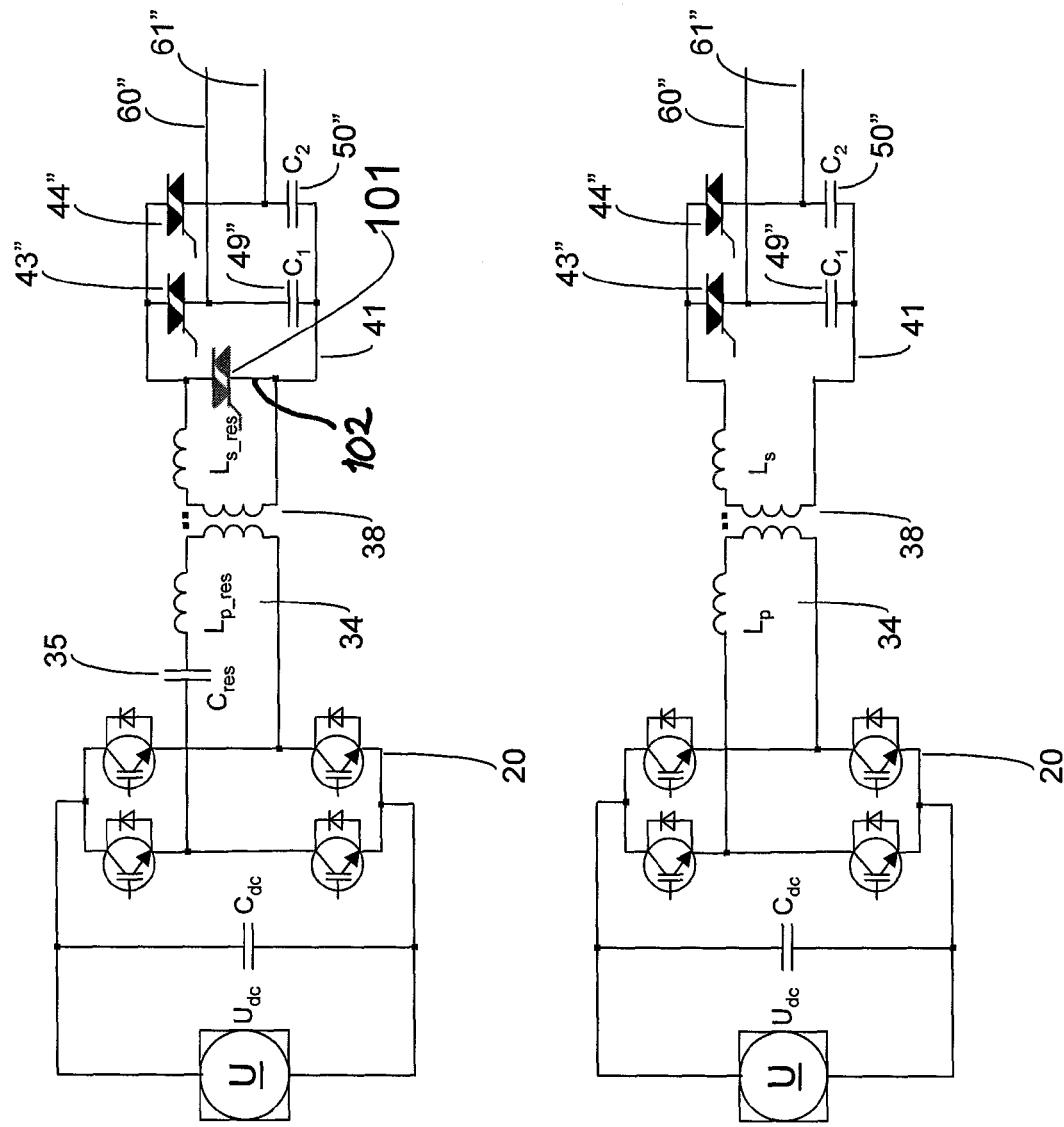

FIG. 6 illustrates an converter according to a fourth embodiment of the invention being a single phase converter modified with respect to that according to FIG. 5 by having a direct converter with two phase legs with switches 43", 44" and second capacitors 49", 50" and with a balanced output provided by the voltage across the two outputs 60, 61 of the direct converter.

Figure 7:
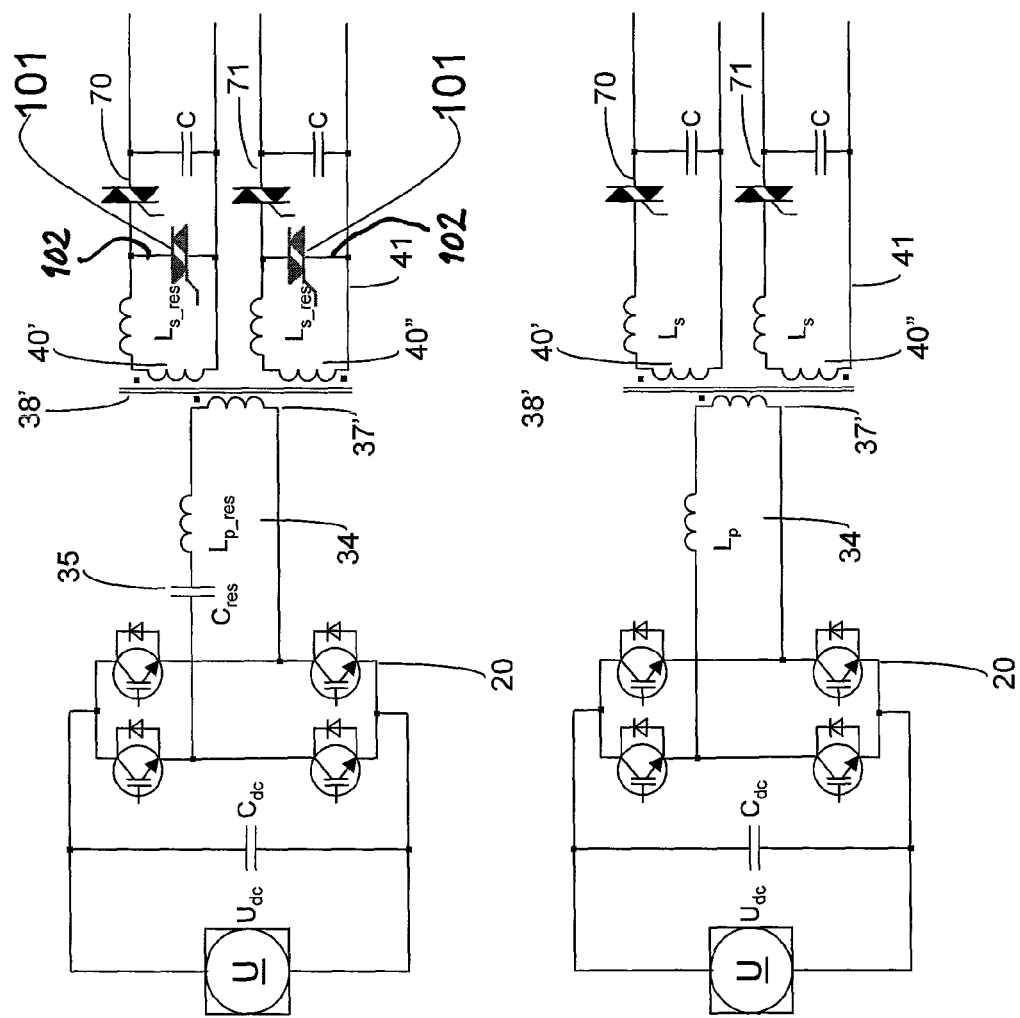

FIG. 7 illustrates an converter according to a fifth embodiment of the invention in the form of a single phase converter configured to generate two output single-phase voltages with the same phase, while using both positive and negative currents following upon each other, which is not possible for the single phase converter shown in FIG. 5, in which for example only positive current pulses may be used as long as the voltage is to be increased and only negative current pulses when the voltage shall be reduced. The transformer 38' has here a primary winding 37' connected to the series resonance link 34, or to an inductive link when such is used, and two secondary windings 40', 40" each connected to a phase leg 70, 71 of the direct converter. The two secondary windings 40', 40" are inverted with respect to each other. This means that when a positive current pulse is received on the phase leg 70 a negative current pulse is received on the phase leg 71, so that two single phase voltages may be generated simultaneously by utilising a current pulse for one phase leg and the following current pulse for the other phase leg then having the same sign as the previous one for the other phase leg.

Figure 8:
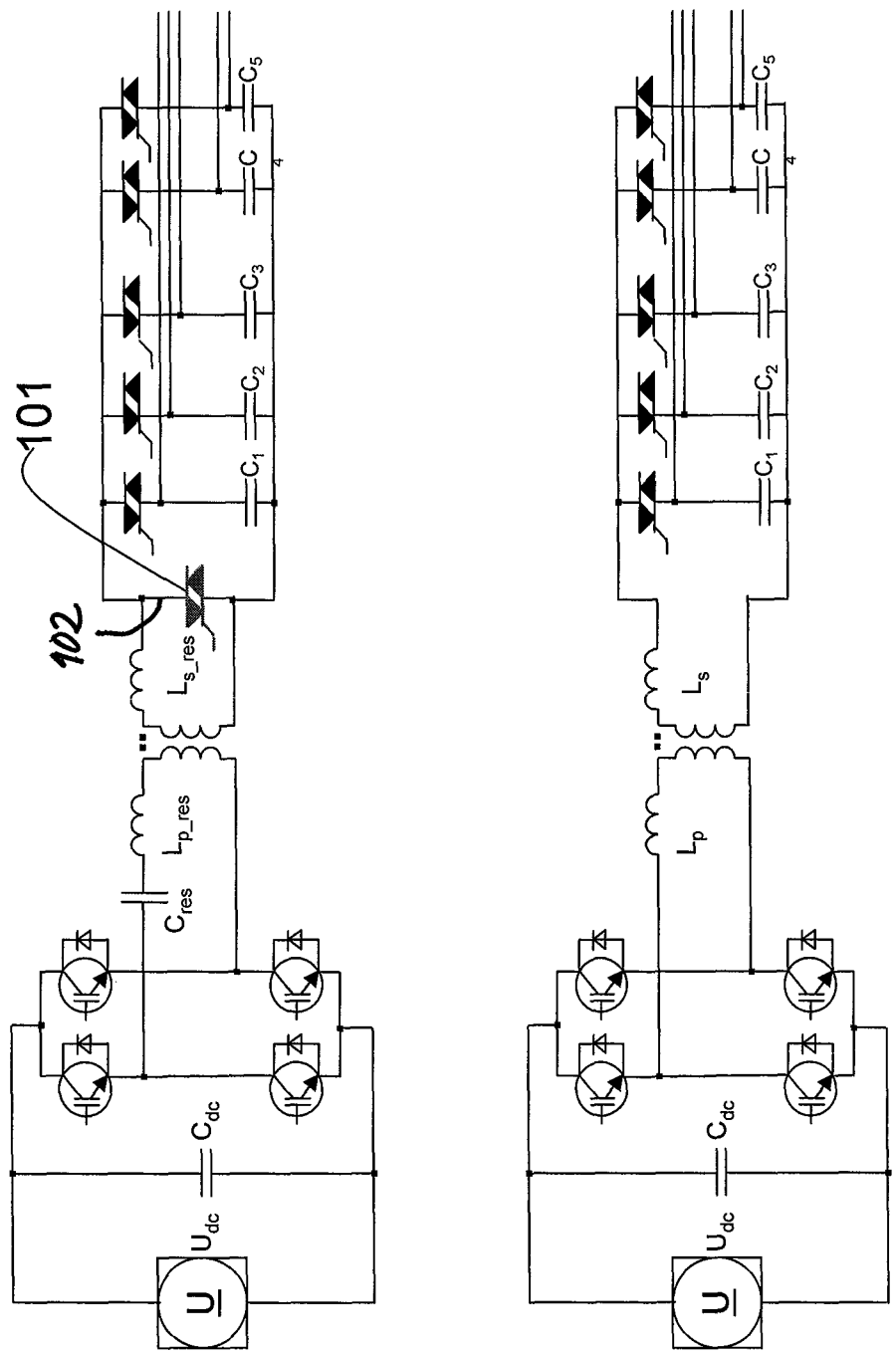
FIG. 8 is a schematic circuit diagram of a converter according to a sixth embodiment of the present invention in which both a three phase output and single phase output share the generation of current pulses.

Finally, FIG. 8 illustrates a converter according to a sixth embodiment of the invention being a combination of the embodiments according to FIG. 3 and FIG. 6 by having a three phase output and a single phase output sharing the generation of current pulses.

The invention is of course not in any way restricted to the embodiments described above, but many possibilities to modification thereof would be apparent to a person with ordinary skill in the art without departing from the scope of the invention as defined in the appended claims.

The invention claimed is:

1. A track-bound vehicle converter for conversion between DC and AC, comprising
   a block wave generator (20) configured to be connected to a direct voltage source (21) and having current valves (26-29),
   a first control unit (39) connected to said current valves (26-29) for controlling said current valves (26-29) and generating block voltage pulses being alternatively positive and negative on an output (32, 33) of said generator (20),
   a series resonance link (34) having at least one first capacitor (35), or an inductive link, and at least one inductance (36) connected by a first end thereof to the output (32, 33) of the generator (20) for generating said block voltage pulses including semi sinusoidal current pulses, or triangular pulses in case of said inductive link (A, B) on a second end of said link (34),
   a direct converter (41) comprising at least one phase leg (42-44, 70, 71) having one switch (45-47) for blocking voltages in both directions there-across and conducting current in both directions therethrough and a second capacitor (48-50) connected in series therewith,
   said direct converter (41) having an output (51-53, 60, 61) between said switch (45-57) and said second capacitor (48-50) for the voltage across said second capacitor (48-50),
   a second control unit (54) connected to said switch (45-57) to alternatively block or let through said pulses to said second capacitor (48-50) for controlling the voltage on said converter output (51-53, 60, 61) by charging or discharging said second capacitor (48-50),
   a further switch (101) arranged to block voltages in both directions thereacross and conduct current in both directions therethrough in a current path (102) in parallel with said at least one phase leg (42-44, 70, 71),
   a device (104) arranged for checking the synchronization of the voltage of said first capacitor (35) with the polarity of the direct voltage from the direct voltage source (21), and
   a third control unit (103) arranged to control said further switch (101) to discharge the first capacitor (35) through said current path if said synchronization is lost and then charge the first capacitor (35) to a voltage with the opposite polarity to obtain said synchronization again.

2. A track bound vehicle converter according to claim 1, wherein said second control unit (54) is configured to control said switch (45-47) to let through a current pulse (A, B) from said series resonance link (34), or from said inductive link, to said second capacitor (48-50) corresponding to half a period of the current generated on said second end of said link each time or when applicable.

3. A track bound vehicle converter according to claim 1, wherein
   said block wave generator (20) has two branches (24, 25) configured to be connected in parallel to a direct voltage source (21) and each having two current valves (26-29) connected in series,
   each current valve has at least one semiconductor device (30) of turn-off type and a rectifying member (31), such as a diode, connected in anti-parallel therewith, and
   the two mid points (32, 33) between the current valves of each branch form the output of the generator (20).

4. A track bound vehicle converter according to claim 1, wherein
   said block wave generator (20) has one branch (24) configured to be connected to a balanced direct voltage source (21') and having two current valves (26-27) connected in series,
   each current valve has at least one semiconductor device (30) of turn-off type and a rectifying member (31), such as a diode, connected in anti-parallel therewith, and
   the output of the generator is taken between the midpoint (32) between the current valves and the midpoint of the direct voltage source.

5. A track bound vehicle converter according to claim 1, wherein said first control unit (39) is arranged and configured to switch said current valves (26-29) with a frequency of 1 kHz-100 kHz.

6. A track bound vehicle converter according to claim 1, configured to deliver a power of 10 kW-1 MW on said converter output (100).

7. A track bound vehicle converter according to claim 1, comprising a transformer (38) connecting said series resonance link (34), or said inductive link, to said direct converter (41).

8. A track bound vehicle converter according to claim 7, wherein
   said converter output is connected to create an alternating voltage being a single phase voltage,
   said transformer (38') has a primary winding (37') connected to said series resonance link (34) or said inductive link, and two secondary windings (40', 40"),
   each secondary winding is connected to a phase leg (70, 71) of the direct converter, and
   the two secondary windings (40', 40") are inverted with respect to each other.

9. A track bound vehicle converter according to claim 1, wherein said second end of said series resonance link (34), or said inductive link, is directly connected to said at least one phase leg (42-44, 70, 71) of the direct converter (41).

10. A track bound vehicle converter according to claim 1, being an auxiliary converter configured to deliver a voltage on the converter output (100) to be used for the heating/cooling system of the vehicle and for electrical appliances, such as through sockets arranged in said vehicle.

11. A track bound vehicle converter according to claim 1, being a motor converter configured to deliver power through the converter output (100) to a motor used to drive the vehicle.

12. A track bound vehicle converter according to claim 1, being a line converter configured to
   in driving mode, absorb power from the AC supply line via a main transformer connected to its AC side and feed it to the motor converter connected to its DC side, and
   in braking mode, absorb power from the motor converter and feed it to the main transformer and back to the AC supply line.

13. A track bound vehicle converter according to claim 1, wherein
   said direct converter (41) has three said phase legs (42-44) connected in parallel and each having said switch (45-47) and said second capacitor (48-50) connected in series, and
   said second control unit (54) is configured to control the switches of the three phase legs (42-44) to alternately make one of them at a time conducting current to or from its corresponding second capacitors (48-50) such that said second capacitors (48-50) belonging to the different phase legs (42-44) are all charged and discharged by said current pulses from said series resonance link (34), or said inductive link.

14. A track bound vehicle converter according to claim 12, wherein said converter output is connected to create an alternating voltage being a single phase voltage.

15. A track bound vehicle converter according to claim 14, wherein the direct converter has only one phase leg (44') and said converter output is configured to form said single phase voltage by the voltage across said second capacitor (50').

16. A track bound vehicle converter according to claim 14, wherein
- said direct converter has two phase legs (43", 44") connected in parallel, and
- said second control unit (54) is configured to control the two switches (46, 47) of these phase legs (43", 44") to enable said converter output to create an alternating voltage being a single phase voltage delivered by the voltage across the converter outputs (60, 61) of said two phase legs (43", 44").

17. A track-bound vehicle (1) having at least one converter according to claim 1, and having an alternating current source and supply line (2),
with a transformer (3) connected to the supply line (2).

18. A track-bound vehicle converter for conversion between DC and AC, comprising:
- a block wave generator (20),
- a series resonance link (34) having at least one first capacitor (35) or an inductive link connected by a first end thereof to the output (32, 33) of the generator (20) for generating said block voltage pulses including semi sinusoidal current pulses, or triangular pulses in case of said inductive link (A, B) on a second end of said link (34),
- a direct converter (41) comprising at least one phase leg (42-44) having a switch (45-47) for blocking voltages in both directions thereacross and conducting current in both directions therethrough and a second capacitor (48-50) connected in series therewith,
- said direct converter (41) having an output between said switch (45-57) and said second capacitor (48-50) for the voltage across said second capacitor (48-50), and
- a control unit (54) connected to said switch (45-57) to alternatively block or let through said pulses to said second capacitor (48-50) for controlling the voltage on said converter output by charging or discharging said second capacitor (48-50),
- with said series resonance link (34) directly connected to the at least one phase leg (42-44) of the direct converter (41) and a midpoint (33) of the block wave generator (20) branches connected to an opposite terminal of the at least one phase leg (42-44).

* * * * *